United States Patent
Kitaura et al.

(10) Patent No.: US 7,485,355 B2
(45) Date of Patent: Feb. 3, 2009

(54) OPTICAL INFORMATION RECORDING MEDIUM AND METHOD FOR MANUFACTURING THE SAME

(75) Inventors: Hideki Kitaura, Souraku-gun (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 10/529,298

(22) PCT Filed: Sep. 30, 2003

(86) PCT No.: PCT/JP03/12464

§ 371 (c)(1),
(2), (4) Date: Mar. 25, 2005

(87) PCT Pub. No.: WO2004/032130

PCT Pub. Date: Apr. 15, 2004

(65) Prior Publication Data

US 2006/0072439 A1    Apr. 6, 2006

(30) Foreign Application Priority Data

Oct. 1, 2002    (JP)    ............................. 2002-288594

(51) Int. Cl.
*B32B 3/02*    (2006.01)
(52) U.S. Cl. .................... 428/64.4; 428/64.5; 428/64.6; 439/270.13
(58) Field of Classification Search .............. 428/64.1, 428/64.4, 64.5; 430/270.13
See application file for complete search history.

(56) References Cited

U.S. PATENT DOCUMENTS

| | | | |
|---|---|---|---|
| 3,971,874 A | 7/1976 | Ohta et al. | |
| 4,587,209 A | 5/1986 | Ohno et al. | |
| 4,624,914 A | 11/1986 | Kimura et al. | |
| 5,726,969 A | 3/1998 | Moriya et al. | |
| 5,764,619 A | 6/1998 | Nishiuchi et al. | |
| 6,229,785 B1* | 5/2001 | Kitaura et al. | ........... 369/275.4 |
| 6,456,584 B1 | 9/2002 | Nagata et al. | |
| 6,610,380 B2* | 8/2003 | Kitaura et al. | ............. 428/64.1 |
| 6,768,710 B2* | 7/2004 | Kitaura et al. | ............... 369/100 |
| 2002/0009045 A1 | 1/2002 | Tsukagoshi et al. | |
| 2002/0021656 A1 | 2/2002 | Tsukagoshi et al. | |
| 2002/0022105 A1 | 2/2002 | Kitaura et al. | |
| 2002/0122366 A1 | 9/2002 | Kitaura et al. | |
| 2007/0077521 A1* | 4/2007 | Habuta et al. | .......... 430/270.11 |

FOREIGN PATENT DOCUMENTS

| | | |
|---|---|---|
| EP | 1 180 767 A2 | 2/2002 |
| EP | 1 215 669 A2 | 6/2002 |
| EP | 1 542 217 | 6/2005 |
| JP | 50-46317 | 4/1975 |
| JP | 60-131650 | 7/1985 |
| JP | 60-203490 | 10/1985 |

(Continued)

*Primary Examiner*—Elizabeth Mulvaney
(74) *Attorney, Agent, or Firm*—Hamre, Schumann, Mueller & Larson, P.C.

(57) ABSTRACT

An optical information recording medium includes the first to the n-th information layers (where n is an integer not less than 3) arranged in this order from a laser beam incident side. Each information layer includes a recording layer containing Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. Concentrations of oxygen atoms contained in the first to the n-th recording layers, namely $C(1)$ to $C(n-1)$, satisfy the following relationships: $C(1) \geq C(2) \geq \ldots \geq C(n-2) \geq C(n-1)$, and $C(1) \neq C(n-1)$. When two information layers are included, the oxygen atom concentration of the first information layer is made larger than that of the second information layer.

11 Claims, 2 Drawing Sheets

FOREIGN PATENT DOCUMENTS

| | | |
|---|---|---|
| JP | 61-68296 | 4/1986 |
| JP | 62-88152 | 4/1987 |
| JP | 9-7224 | 1/1997 |
| JP | 9-212917 | 8/1997 |
| JP | 10-505188 | 5/1998 |
| JP | 2000-36130 | 2/2000 |
| JP | 2002-50053 | 2/2002 |
| JP | 2002-133712 | 5/2002 |
| JP | 2002-251778 | 9/2002 |
| WO | 98/09823 | 3/1998 |

* cited by examiner

OPTICAL INFORMATION RECORDING MEDIUM AND METHOD FOR MANUFACTURING THE SAME

TECHNICAL FIELD

The present invention relates to an optical information recording medium including a write-once type recording layer capable of recording/reproducing an information signal having a high signal quality by irradiating a thin film formed on a substrate with a high-energy light beam such as a laser beam and relates to a method for manufacturing the same.

BACKGROUND ART

An optical information recording medium including a thin film formed on a transparent substrate, which enables recording/reproducing of an information signal by irradiating this thin film with a laser beam narrowed into a minute spot, is well-known. As a write-once type optical information recording medium, one including a $TeO_x$ ($0<x<2$) thin recording film formed on a substrate is known (See JP S50-46317A, for example), where $TeO_x$ is a mixture of Te and $TeO_2$. This optical information recording medium allows a larger degree of reflectivity change to be attained by the irradiation with a laser beam for reproduction.

With the use of the $TeO_x$ thin recording film, initialization such as laser annealing can be eliminated, and a crystalline recording mark can be formed by irradiating the film that is in an amorphous state after the film formation with a laser beam. This is an irreversible procedure, so that correction and erasure by overwriting cannot be conducted. Therefore, a medium using this thin recording film can be used as an optical information recording medium enabling write-once only.

In the $TeO_x$ thin recording film, a certain duration of time is required until a signal becomes saturated after recording, i.e., crystallization in the thin recording film by the irradiation with a laser beam proceeds sufficiently. Therefore, the optical information recording medium using the $TeO_x$ thin recording film without any treatment is inappropriate for a recording medium required to have a quick response property, such as a data file for a computer in which data is recorded on a disk and the data is to be verified after one rotation of the disk. In order to compensate for this drawback, it has been suggested that Pd, Au or the like is added as the third element to the $TeO_x$ thin recording film (See JP S60-203490A, JP S61-68296A and JP S62-88152, for example).

Pd and Au are considered to have a function of promoting the crystal growth of Te in the $TeO_x$ thin recording film during the irradiation with a light beam. The addition of Pd or Au enables the generation of crystal grains of Te and Te—Pd alloy or Te—Au alloy at a high speed. Furthermore, since Pd and Au have good resistance to oxidation, these elements will not degrade the good moisture resistance of the $TeO_x$ thin recording film.

Meanwhile, as a basic means for increasing the amount of information that one optical information recording medium can deal with, there is a method for shortening the wavelength of a laser beam or increasing the numerical aperture of an objective lens for collecting the laser beam so as to decrease a spot size of the laser beam, thus enhancing a recording surface density. Furthermore, in order to enhance the recording density in the circumferential direction, mark edge recording has been proposed and introduced in which a length of a recording mark represents information. Moreover, in order to enhance the recording density in the radius direction, land & groove recording has been proposed and introduced, in which recording is performed with respect to both of a groove for guiding a laser beam and a land between the grooves. As a further means for increasing the amount of information, a multilayer structured optical information recording medium including a plurality of laminated information layers and a method for recording and reproducing with respect to the same also have been proposed (See JP H9-212917A, JP H10-505188A and JP 2000-36130A, for example).

In order to be ready for such high-density recording, an optical information recording medium with an improved composition of a recording material of a $TeO_x$ thin recording film containing Pd, Au or the like added thereto as a third element and an improved film thickness has been proposed for a write-once type optical information recording medium (See WO98/09823A1, for example).

An important challenge for making multilayer structured optical information recording media practical is to enhance the recording sensitivity. Optical information recording media generally adopt a general-purpose laser diode as a light source for recording/reproducing, so that the recording should be performed within a limited laser power output.

In the multilayer structure, however, recording/reproducing are performed by using a laser beam that is incident from one side to the plurality of information layers, and therefore recording is performed on an information layer located farther from a laser beam incident side with a laser beam that is attenuated during the passage through information layers located closer to the laser beam incident side. Therefore, an information layer disposed farther from the laser beam incident side is required to have a higher recording sensitivity. On the other hand, an information layer located closer to the laser beam incident side is required to have a higher transmittance.

DISCLOSURE OF THE INVENTION

A first optical information recording medium of the present invention includes: a substrate; and at least n information layers (where n is an integer of at least 3) provided on the substrate. Each of the n information layers includes a recording layer containing Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. When the n information layers are represented as a first to a n-th information layers from a laser beam incident side, assuming that $C(j)$ % denotes a concentration of oxygen atoms contained in the recording layer included in a j-th information layer (where j is an integer satisfying $1 \leq j \leq n-1$), $C(1)$ to $C(n-1)$ satisfy the following relationships:

$$C(1) \geq C(2) \geq \ldots \geq C(n-2) \geq C(n-1), \text{ and}$$

$$C(1) \neq C(n-1).$$

A second optical information recording medium of the present invention includes: a substrate; and a first information layer and a second information layer provided in this stated order from a laser beam incident side on the substrate. Each of the first information layer and the second information layer includes a recording layer containing Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. A concentration of oxygen atoms contained in the recording layer included in the first information layer is larger than a concentration of oxygen atoms contained in the recording layer included in the second information layer.

A first optical information recording medium manufacturing method of the present invention is for manufacturing a recording medium including n information layers (where n is an integer of at least 3) provided on a substrate. The method includes the steps of: forming an information layer including a recording layer containing Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, the step being performed n times. When the information layers formed in the information layer formation steps are represented as a first to a n-th information layers from a laser beam incident side, assuming that $C(j)$ % denotes a concentration of oxygen atoms contained in the recording layer included in a j-th information layer (where j is an integer satisfying $1 \leq j \leq n-1$), the first to the n-th information layers are formed so that $C(1)$ to $C(n-1)$ satisfy the following relationships:

$$C(1) \geq C(2) \geq \ldots \geq C(n-2) \geq C(n-1), \text{ and}$$

$$C(1) \neq C(n-1).$$

A second optical information recording medium manufacturing method of the present invention is for manufacturing a recording medium including two information layers provided on a substrate. The method includes the steps of: forming an information layer comprising a recording layer comprising Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, the step being performed twice. When the information layers formed in the information layer formation steps are represented as a first information layer and a second information layer from a laser beam incident side, the first information layer and the second information layer are formed so that a concentration of oxygen atoms contained in the recording layer included in the first information layer is larger than a concentration of oxygen atoms contained in the recording layer included in the second information layer.

BEST MODE FOR CARRYING OUT THE INVENTION

Figure 1:
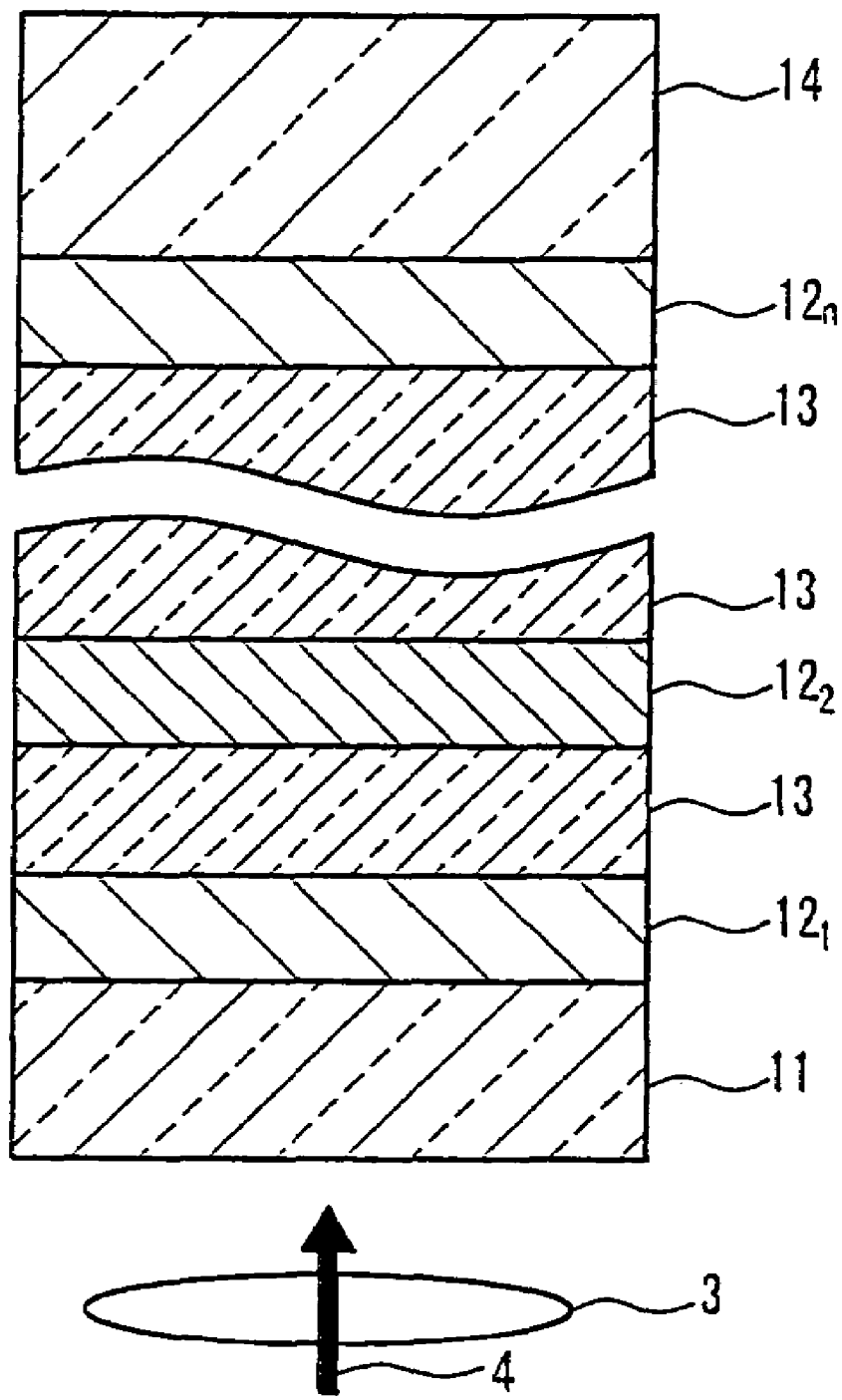
FIG. 1 is a cross-sectional view showing one embodiment of an optical information recording medium of the present invention.

In the first optical information recording medium of the present invention, concentrations of oxygen atoms contained in the recording layers in the first to the n-th information layers, i.e., $C(1)$ to $C(n-1)$, satisfy the following relationships:

$$C(1) \geq C(2) \geq \ldots \geq C(n-2) \geq C(n-1),$$
$$\text{and } C(1) \neq C(n-1).$$

Thus, the recording sensitivity of an information layer disposed farther from a laser beam incident side can be increased, and the transmittance of an information layer disposed closer to the laser beam incident side can be increased. Thereby, a multilayer structured optical information recording medium having a favorable recording sensitivity and a high C/N ratio can be provided.

In the first optical information recording medium of the present invention, assuming that $C(n)$ % denotes a concentration of oxygen atoms contained in the recording layer in the n-th information layer, $C(n-1)$ and $C(n)$ may satisfy the following relationship:

$$C(n-1) \geq C(n).$$

With this configuration, a recording sensitivity can be enhanced further.

In the first optical information recording medium of the present invention, preferably, the n-th information layer further includes a reflective layer that is disposed on an opposite side of the laser beam incident side with reference to the recording layer included in the n-th information layer, and the reflective layer is made of a material having a refractive index of 3 or less and an extinction coefficient of 1 or more. With this configuration, a recording sensitivity can be enhanced further.

In the first optical information recording medium of the present invention, preferably, at least one information layer of the first to the n-th information layers further includes a protective layer that is disposed on at least one side of the laser beam incident side and an opposite side of the laser beam incident side with reference to the recording layer included in the at least one information layer, and the protective layer is made of a dielectric material having a refractive index of 1.5 or more. This is for protecting the recording layer and for realizing effective light absorption at the recording layer.

In the second optical information recording medium of the present invention, a concentration of oxygen atoms contained in the recording layer included in the first information layer is larger than a concentration of oxygen atoms contained in the recording layer included in the second information layer, whereby the recording sensitivity of the second information layer can be increased, and the C/N ratio of the first information layer can be increased. Thereby, a double-layer structured optical information recording medium having a favorable recording sensitivity and a high C/N ratio can be provided.

In the second optical information recording medium of the present invention, preferably, the second information layer further includes a reflective layer that is disposed on an opposite side of the laser beam incident side with reference to the recording layer included in the second information layer, and the reflective layer is made of a material having a refractive index of 3 or less and an extinction coefficient of 1 or more. With this configuration, a recording sensitivity can be enhanced further.

In the second optical information recording medium of the present invention, preferably, at least one information layer of the first information layer and the second information layer further includes a protective layer that is disposed on at least one side of the laser beam incident side and an opposite side of the laser beam incident side with reference to the recording layer included in the at least one information layer, and the protective layer is made of a dielectric material having a refractive index of 1.5 or more. This is for protecting the recording layer and for realizing effective light absorption at the recording layer.

According to the first manufacturing method of the present invention, the first optical information recording medium of the present invention can be manufactured, and according to the second manufacturing method of the present invention, the second optical information recording medium of the present invention can be manufactured.

In the first and the second manufacturing methods of the present invention, preferably, in the information layer formation steps, at least after the formation of the recording layer, annealing is performed so as to keep the recording layer at 60° C. or more for 5 minutes or more. This annealing allows mark edges to be aligned well and marks to be formed in a uniform mark configuration.

The following describes embodiments of the present invention more specifically, with reference to the drawings.

Embodiment 1

FIG. 1 is a partial cross-sectional view showing one embodiment of an optical information recording medium of the present invention.

The optical information recording medium 1 of the present embodiment is configured so that a first information layer $12_1$, a second information layer $12_2$, ... and a n-th information layer $12_n$ are laminated in this stated order on a transparent substrate 11 with a separation layer 13 interposed therebetween. Herein, n is an integer of 3 or more. On the n-th information layer $12_n$, a protective substrate 14 is provided. The separation layers 13 have a function of optically separating the information layers $12_1$ to $12_n$ mutually so as to eliminate unnecessary optical interference. With respect to this optical information recording medium 1, a laser beam 4 collected by an objective lens 3 is projected from a side of the transparent substrate 11, whereby information signals are recorded and reproduced.

Each of the first to the n-th information layers $12_1$ to $12_n$ has a recording layer. In addition to the recording layer, a protective layer made of a dielectric material and a reflective layer made of an alloy material or the like may be provided therein.

As a material of the transparent substrate 11, a material that is substantially transparent to the wavelength of the laser beam 4 is available, which includes polycarbonate, polymethyl methacrylate, polyolefin, norbornane based resin, ultraviolet curable resin, glass or a material containing the combination of these materials as required, for example. The thickness of the transparent substrate 11 is not limited particularly, and about 0.01 to 1.5 mm is preferable. Particularly, the transparent substrate 11 with a thickness of 0.3 mm or less preferably is used for high-density recording using an optical system with a lens having a large numerical aperture.

The recording layers included in the respective information layers $12_1$ to $12_n$ are formed of a material containing Te, O and M as a main component. Herein, M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. Particularly, at least one of Pd and Au preferably is included, because the addition of at least one of Pd and Au makes it easy to realize a sufficient crystallization speed and high environmental stability. Note here that the main component in this specification refers to one or more components contained exceeding 80 atomic %. When the main component consists of two or more components, the total of the components should be 80 atomic % or more.

Furthermore, in the first to the n−1th information layers $12_1$ to $12_{n-1}$, the concentrations of oxygen atoms contained in the respective recording layers $C(1)$ to $C(n-1)$ satisfy the following relationships:

$$C(1) \geq C(2) \geq \ldots \geq C(n-2) \geq C(n-1),$$
$$\text{and } C(1) \neq C(n-1).$$

Furthermore, this may be formed as $C(n-1) \geq C(n)$ so as to include the n-th information layer $12_n$ also.

The thus specified concentrations of oxygen atoms contained in the recording layers included in the respective information layers allow, even in the multilayer structure in which n information layers are laminated as in the present embodiment, the recording sensitivity of an information layer disposed farther from a laser beam incident side to be increased and allow the transmittance of an information layer disposed closer to the laser beam incident side to be increased. Thus, a favorable recording sensitivity and a high C/N ratio can be obtained.

Furthermore, each recording layer preferably contains oxygen atoms from 25 atomic % to 60 atomic %, inclusive, and M atoms from 1 atomic % to 35 atomic %, inclusive. When oxygen atoms contained in each recording layer account for 25 atomic % or more, the thermal conductivity of the recording layer does not become too high, thus suppressing an excessively large recording mark. Therefore, a high C/N ratio can be obtained. When oxygen atoms contained in each recording layer account for 60 atomic % or less, the thermal conductivity of the recording layer does not become too low, thus enabling the formation of a sufficient large recording mark. Therefore, a high recording sensitivity can be realized.

When M atoms contained in each recording layer account for 1 atomic % or more, the function of promoting the crystal growth of Te during the irradiation with a laser beam can be obtained sufficiently. Therefore, the crystallization speed of the recording layer can be enhanced sufficiently. Thus, a recording mark can be formed at a high speed. When M atoms contained in each recording layer account for 35 atomic % or less, a reflectivity change between amorphous—crystal can be increased, so that a sufficient C/N ratio can be obtained.

The recording layers further may contain elements other than Te, O and M. For example, they may contain at least one element selected from the group consisting of S, N, F, B and C for the purpose of adjusting a thermal conductivity and an optical constant and for enhancing heat-resisting properties and environmental reliability. These elements preferably account for 20 atomic % or less of the recording layers as a whole.

The thickness of a recording layer preferably is from 2 nm to 70 nm, inclusive. The thickness of 2 nm or more allows a sufficient reflectivity and such a reflectivity change to be attained, and in this respect, a recording layer preferably has a thickness of 5 nm or more. On the other hand, the thickness of 70 nm or less allows the thermal diffusion in a thin film plane in the recording layer to be controlled so as not to be excessively large. Therefore, a high C/N ratio can be obtained in high-density recording.

As a material of the reflective layer, a material having a refractive index of 3 or less and an extinction coefficient of 1 or more may be used. Furthermore, a refractive index of 2 or less and an extinction coefficient of 2.0 or more are more preferable. More specifically, metal including Au, Ag, Cu, Al, Ni, Pd, Pt, Bi, Sb, Sn, Zn, Cr and the like, semimetal or an alloy material, or dielectric such as TiN and ZrN can be used, for example.

As the dielectric material for forming the protective layer, a material having a refractive index of 1.5 or more, preferably 2.0 or more, more preferably 2.5 or more can be used. More specifically, a material containing ZnS, ZnS—$SiO_2$, $TiO_2$, $ZrO_2$, Si, SiC, $Si_3N_4$, GeN or the like as a main component is suitable.

The optical information recording medium 1 of the present embodiment may be provided with an additional information layer, in addition to the first to the n-th information layers $12_1$ to $12_n$ including recording layers made of a material containing Te, O and M as a main component. For instance, an information layer having a recording layer made of a material different from that containing Te, O and M as main component may be included, or an information layer having a rewritable type or a read-only type recording layer and not a write-once type recording layer may be included. These information layers may be added at arbitrary positions with reference to the first to the n-th information layers $12_1$ to $12_n$.

As the separation layers 13, a UV-curable resin or the like can be used. The thickness of a separation layer 13 should be at least the depth of focus determined by the numerical aperture NA of the objective lens 3 and the wavelength $\lambda$ of the laser beam 4 so that, when reproduction is performed from one of the first to the n-th information layers $12_1$ to $12_n$, the crosstalk from the other layers can be made small. It also is necessary that the first to the n-th information layers $12_1$ to $12_n$ as a whole have a thickness in a range capable of focusing light therein. For instance, in the case of $\lambda$=405 nm and NA=0.85, it is necessary that the thickness of a separation layer 13 is not less than 5 µm and not more than 50 µm.

As a material of the protective substrate 14, the same materials as those exemplified for the transparent substrate 11 may be used, or a material different from those for the transparent substrate 11 may be used. The material of the protective substrate 14 may not be transparent to the wavelength of the laser beam 4. The thickness of the protective substrate 14 is not limited particularly, and about 0.05 to 3.0 mm is preferable.

Furthermore, two optical information recording media 1 may be prepared, which then may be attached with the respective protective substrates 14 to be opposed to each other, so as to have a double-sided configuration. With this configuration, the amount of information that is accumulated in one medium can be doubled.

The respective thin films included in the optical information recording medium 1 can be formed, for example, by a vapor-phase thin film. depositing method such as vacuum evaporation, sputtering, ion plating, chemical vapor deposition (CVD) or molecular beam epitaxy (MBE).

After the thin films to be included in the recording layers and the separation layers 13 are formed successively on the transparent substrate 11, the protective substrate 14 may be formed (or attached). Conversely, after the thin films to be included in the recording layers and the separation layers 13 are formed successively on the protective substrate 14, the transparent substrate 11 may be formed (or attached). In particular, the latter is suitable for the case where the transparent substrate 11 is thin (i.e., 0.3 mm or less). In such a case, grooves for guiding a laser beam and a concave-convex pattern such as an address signal are formed on the surfaces of the protective substrate 14 and the separation layer 13. More specifically, using a transfer substrate such as a stamper or the like in which a desired pattern is formed beforehand, the grooves and the concave-convex pattern are formed by transferring. At this time, when the thickness is so small as in the separation layer 13 and it is difficult to perform a usually used injection method, a photo-polymerization method (2P method) can be used.

According to the optical information recording medium 1 of the present embodiment, grooves, lands between the grooves or both the grooves and the lands can be used as recording tracks. A distance between the recording tracks is not limited particularly, and the distance preferably is designed as $\lambda$/NA or less, particularly $0.8\lambda$/NA or less, so as to allow for high-density recording, where $\lambda$ denotes the wavelength of the laser beam 4 used for recording/reproducing and NA denotes the numerical aperture of the lens.

Furthermore, annealing may be performed for the optical information recording medium 1 of the present embodiment so as to allow it to be kept under a high temperature condition for a certain time duration, whereby a higher C/N ratio and a lower jitter value can be obtained. Conceivably, this results from the following: the annealing causes a part of the atoms dispersed at random in the recording layer to be combined appropriately so as to form a minute crystalline nucleus. This allows the crystallization during the recording to be performed more smoothly, so that mark edges can be aligned well and marks can be formed to have a uniform mark configuration.

The temperature of the annealing depends on the composition of the recording layers, and a temperature not less than 60° C. and at which the transparent substrate 11 does not melt, i.e., a temperature not more than the softening point or the melting point of the transparent substrate 11, is preferable. In the case where the transparent substrate 11 is formed of polycarbonate, for example, the temperature of the annealing preferably is set at 120° C. or less. The time for the annealing depends on the composition of the recording layers and the temperature of the annealing, and at least 5 minutes are required for saturating effects such as the enhancement of a C/N ratio. Furthermore, although the annealing may be performed for a long time, even if the annealing is continued after the saturation of the effects, there basically would be no changes observed for the recording/reproducing properties.

Embodiment 2

Figure 2:
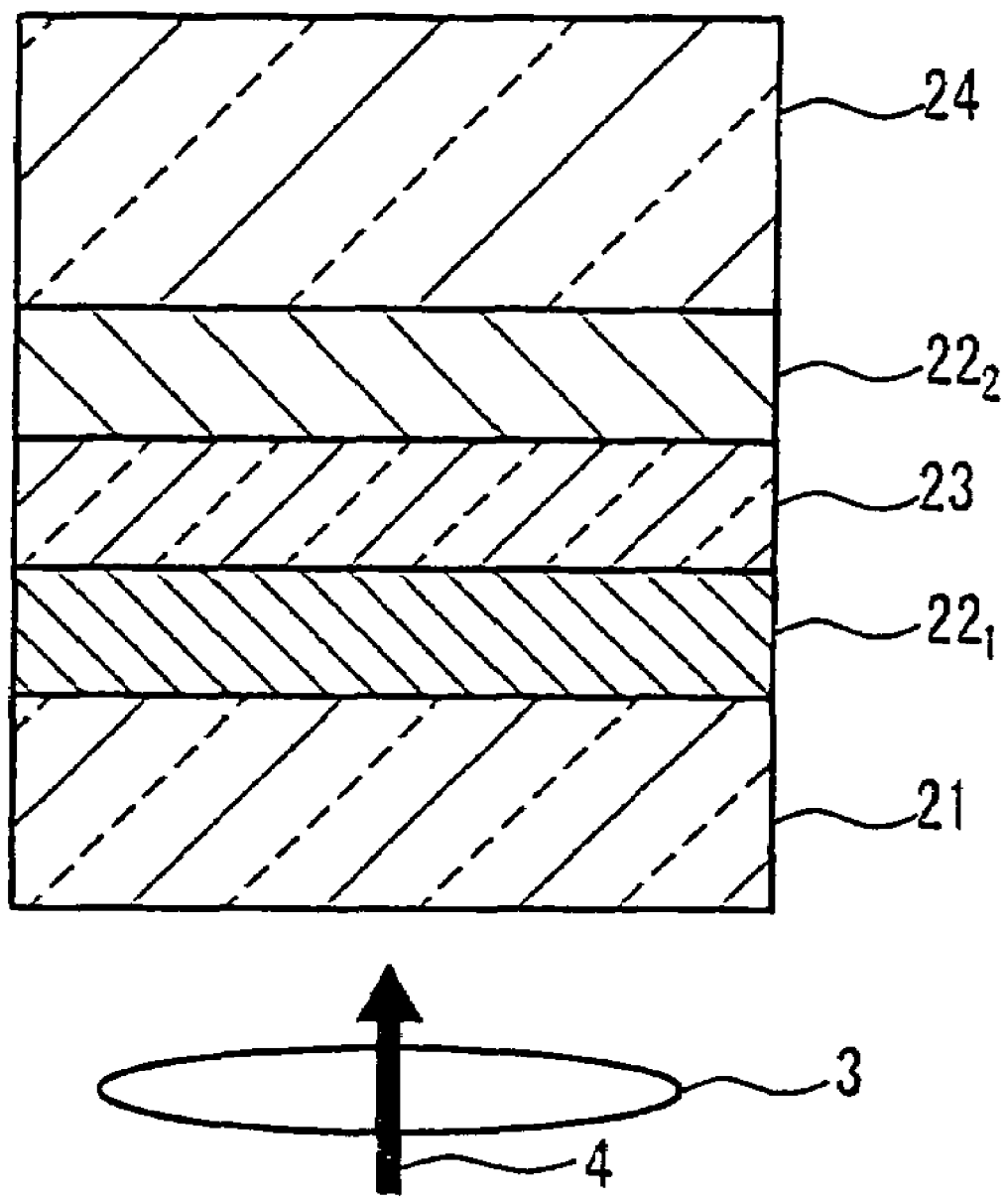
FIG. 2 is a cross-sectional view showing another embodiment of the optical information recording medium of the present invention.

Another embodiment of the optical information recording medium of the present invention will be described below, with reference to FIG. 2. FIG. 2 shows a cross-sectional configuration of an optical information recording medium 2 according to the present embodiment.

In the optical information recording medium 2 of the present embodiment, a first information layer $22_1$, a separation layer 23 and a second information layer $22_2$ are provided in this stated order on a transparent substrate 21, and a protective substrate 24 further is provided thereon. Recording/reproducing is performed by irradiating this optical information recording medium 2 with a laser beam 4 collected by an objective lens 3 from a side of the transparent substrate 21.

The transparent substrate 21, the separation layer 23 and the protective substrate 24 have the same functions as those of the transparent substrate 11, the separation layer 13 and the protective substrate 14 described in Embodiment 1, and can be formed into the same shapes using the same materials as those in Embodiment 1.

Each of the first information layer $22_1$ and the second information layer $22_2$ includes a recording layer. The recording layers, similarly to Embodiment 1, are formed of a material containing Te, O and M as a main component. The concentration of oxygen atoms contained in the first information layer $22_1$ is set larger than the concentration of oxygen atoms contained in the second information layer $22_2$. With this configuration, the first information layer $22_2$ has a higher transmittance and the second information layer $22_2$ has a higher recording sensitivity, and therefore a sufficient recording sensitivity and such a C/N ratio can be obtained in a multilayered structure in which the two information layers are laminated. Note here that the preferable concentrations of oxygen atoms and M atoms contained in the respective recording layers and the preferable thickness range of a recording layer are the same as those of the optical information recording medium 1 of Embodiment 1.

The second information layer $22_2$ further may include a reflective layer disposed on a laser beam incident side relative to the recording layer. As a material of the reflective layer, a material having a refractive index of 3 or less and an extinction coefficient of 1 or more may be used. Furthermore, a refractive index of 2 or less and an extinction coefficient of 2.0 or more are more preferable. Specific examples of the materials to be used are the same as those described for the reflective layer in Embodiment 1.

Furthermore, the first information layer $22_1$ and the second information layer $22_2$ further may include a protective layer that is disposed on at least one side relative to the recording layer. As a dielectric material for forming the protective layer, a material having a refractive index of 1.5 or more, preferably 2.0 or more, more preferably 2.5 or more can be used. Specific examples of the materials to be used are the same as those described for the protective layer in Embodiment 1.

Furthermore, the manufacturing method of the optical information recording medium 1 described in Embodiment 1 is applicable to a method for manufacturing the optical information recording medium 2 of the present embodiment.

EXAMPLES

The following describes the present invention more specifically, by way of examples. However, the present invention is not limited to the following examples.

Example 1

In Example 1, a medium having a disk shape in which four information layers are provided in the optical information recording medium 1 described in Embodiment 1 was produced.

As a protective substrate 14, a polycarbonate substrate was used. The diameter of the protective substrate 14 was 12 cm, the thickness was 1.1 mm, the groove pitch was 0.32 μm and the groove depth was 20 nm.

On a surface of the protective substrate 14 at which the grooves had been formed, as a fourth information layer $12_4$, an Al—Cr reflective layer of about 40 nm in thickness, a Zn—S protective layer of about 15 nm in thickness, a Te—O—Pd recording layer of about 20 nm in thickness and a Zn—S protective layer of about 15 nm in thickness were laminated by sputtering in this stated order, which were formed respectively using an Al—Cr target (the ratio of the number of atoms 98:2), a Zn—S target (the ratio of the number of atoms 50:50), a Te—Pd target (the ratio of the number of atoms 90:10) and a Zn—S target (the ratio of the number of atoms 50:50). On the surface of this fourth information layer $12_4$, the same groove pattern as that formed in the protective substrate 14 was transferred using a UV-curable resin by a 2P method, whereby a separation layer 13 of about 13 μm in thickness was formed.

On the surface of this separation layer 13, as a third information layer $12_3$, a Zn—S protective layer of about 10 nm in thickness, a Te—O—Pd recording layer of about 10 nm in thickness and a Zn—S protective layer of about 30 nm in thickness were laminated by sputtering in this stated order, which were formed respectively using a Zn—S target (the ratio of the number of atoms 50:50), a Te—Pd target (the ratio of the number of atoms 90:10) and a Zn—S target (the ratio of the number of atoms 50:50). On the surface of this third information layer $12_3$, the same groove pattern as that formed in the protective substrate 14 was transferred using a UV-curable resin by a 2P method, whereby a separation layer 13 of about 13 μm in thickness was formed.

On the surface of this separation layer 13, as a second information layer $12_2$, a Zn—S protective layer of about 15 nm in thickness, a Te—O—Pd recording layer of about 8 nm in thickness and a Zn—S protective layer of about 30 nm in thickness were laminated by sputtering in this stated order, which were formed respectively using a Zn—S target (the ratio of the number of atoms 50:50), a Te—Pd target (the ratio of the number of atoms 90:10) and a Zn—S target (the ratio of the number of atoms 50:50). On the surface of this second information layer $12_2$, the same groove pattern as that formed in the protective substrate 14 was transferred using a UV-curable resin by a 2P method, whereby a separation layer 13 of about 13 μm in thickness was formed.

On the surface of this separation layer 13, as a first information layer $12_1$, a Zn—S protective layer of about 20 nm in thickness, a Te—O—Pd recording layer of about 6 nm in thickness and a Zn—S protective layer of about 35 nm in thickness were laminated by sputtering in this stated order, which were formed respectively using a Zn—S target (the ratio of the number of atoms 50:50), a Te—Pd target (the ratio of the number of atoms 90:10) and a Zn—S target (the ratio of the number of atoms 50:50). On the surface of this first information layer $12_1$, a sheet of polycarbonate was attached using a UV-curable resin, thus forming a transparent substrate 11 of 0.08 mm in thickness.

The respective layers were formed by using the targets of 100 mm in diameter and about 6 mm in thickness, where the reflective layers were formed with a DC power supply of 500 W, the protective layers were formed with a RF power supply of 500 W and the recording layers were formed with a DC power supply of 100 W. Furthermore, the reflective layers and the protective layers were formed in Ar ($4.2 \times 10^{-7}$ m$^3$/s (25 sccm)) and the recording layers were formed in a mixed gas of Ar ($4.2 \times 10^{-7}$ m$^3$/s (25 sccm)) and oxygen, where all of the layers were formed in an atmosphere kept at a gas pressure of about 0.2 Pa. Annealing further was performed thereto at 90° C. for about 2 hours so as to obtain a finished disk.

Herein, the flow rate of oxygen was regulated during the formation of the recording layers as shown in Table 1, and disk A was produced as this example and disk B was produced as a comparative example.

TABLE 1

| | | Flow rate of oxygen during formation of recording layer | Concentration of oxygen atoms contained in recording layer |
|---|---|---|---|
| Disk A | 1st information layer | $3.7 \times 10^{-7}$ m$^3$/s (22 sccm) | 54 atomic % |
| | 2nd information layer | $3.3 \times 10^{-7}$ m$^3$/s (20 sccm) | 50 atomic % |
| | 3rd information layer | $3.0 \times 10^{-7}$ m$^3$/s (18 sccm) | 47 atomic % |
| | 4th information layer | $3.3 \times 10^{-7}$ m$^3$/s (20 sccm) | 50 atomic % |
| Disk B | 1st information layer | $3.3 \times 10^{-7}$ m$^3$/s (20 sccm) | 50 atomic % |
| | 2nd information layer | $3.3 \times 10^{-7}$ m$^3$/s (20 sccm) | 50 atomic % |
| | 3rd information layer | $3.3 \times 10^{-7}$ m$^3$/s (20 sccm) | 50 atomic % |
| | 4th information layer | $3.3 \times 10^{-7}$ m$^3$/s (20 sccm) | 50 atomic % |

In disk A, the flow rate of oxygen was decreased in the order from the first information layer $12_1$ to the third information layer $12_3$. On the other hand, in disk B, the flow rate of oxygen was made constant for all of the first information layer $12_1$ to the fourth information layer $12_4$.

Table 1 further shows the contents of oxygen in each recording layer of each disk, which were the results obtained by Auger electron spectroscopy. According to the results, it was found that the contents of oxygen (concentrations of oxygen atoms contained) in the recording layer increase in accordance with the increase of the oxygen flow rate.

Next, Table 2 shows the optical properties at the wavelength of 405 nm of the respective information layers of disks A and B.

TABLE 2

|  |  | Optical properties of single information layer | | Optical properties of laminated information layers | |
|---|---|---|---|---|---|
|  |  | Transmittance | Reflectivity | Arrival rate of incident light | Reflectivity |
| Disk A | 1st information layer | 81% | 4.2% | 100.0% | 4.2% |
|  | 2nd information layer | 75% | 6.3% | 81.0% | 4.1% |
|  | 3rd information layer | 69% | 10.9% | 60.8% | 4.0% |
|  | 4th information layer | 0% | 22.6% | 41.9% | 4.0% |
| Disk B | 1st information layer | 78% | 4.7% | 100.0% | 4.7% |
|  | 2nd information layer | 75% | 6.3% | 78.0% | 3.8% |
|  | 3rd information layer | 71% | 9.1% | 58.5% | 3.1% |
|  | 4th information layer | 0% | 22.6% | 41.5% | 3.9% |

A sample was prepared by forming each information layer alone on a polycarbonate substrate, and the reflectivity and the transmittance of the sample was measured with a spectroscope. From the results, the rate of the amount of light arriving at each information layer to the amount of the incident light and the rate of the light returned by the reflection from each information layer, i.e., reflectivity, were calculated. According to the results of Table 2, it was confirmed that, even when the information layers have the same configuration for thicknesses, the transmittance increased but the reflectivity decreased in accordance with the increase of the contents of oxygen in a layer. Furthermore, it was confirmed that, in the lamination state, disk A had arrival rates of the incident light to the second information layer $12_2$ to the fourth information layer $12_4$ that were higher than those of disk B, and the reflectivities of the first information layer $12_1$ to the fourth information layer $12_4$ were more uniform in disk A than in disk B. From these results, it was found that in disk A it was easier to let the respective layers have a uniform recording sensitivity and such a signal strength level, and therefore disk A was preferable in terms of the design of a drive.

With respect to the grooves of the respective information layers of disk A and disk B, a single signal at 12.3 MHz was recorded using an optical system with a wavelength of 405 nm and a NA of 0.85, while rotating the disks at a linear speed of 5.0 m/s. The pulse waveform used for the recording was a single rectangular pulse that was modulated between a peak power P1 and a bias power P2, and the pulse width was set at 20.4 ns. The bias power P2 was 1.0 mW and the reproduction power Pr was set at 0.5 mW for the reproduction of the first information-layer $12_1$, 0.6 mW for the reproduction of the second information layer $12_2$, 0.7 mW for the reproduction of the third information layer $12_3$ and 1.0 mW for the reproduction of the fourth information layer $12_4$. Under these conditions, recording was performed-only once with respect to an unrecorded track, and the C/N ratio of the signal was measured with a spectrum analyzer. While changing the peak power P1, the C/N ratio was measured, so that the peak power P1 at which the C/N ratio was reduced by 3 dB from the maximum value was found, and 1.3 times the found peak power P1 was set at the recording sensitivity.

Table 3 shows the results of the above-stated measurement conducted with respect to the respective information layers of disks A and B.

TABLE 3

|  |  | Recording sensitivity | C/N ratio |
|---|---|---|---|
| Disk A | 1st information layer | 9.0 mW | 51 dB |
|  | 2nd information layer | 9.5 mW | 51 dB |
|  | 3rd information layer | 10.0 mW | 51 dB |
|  | 4th information layer | 10.0 mW | 52 dB |
| Disk B | 1st information layer | 9.0 mW | 51 dB |
|  | 2nd information layer | 10.0 mW | 51 dB |
|  | 3rd information layer | 12.0 mW | 50 dB |
|  | 4th information layer | 11.5 mW | 52 dB |

As shown in Table 3, the C/N ratios of 50 dB or more could be obtained in all of the information layers of both disks, and it was confirmed that these disks were at a sufficient level for practical optical information recording media. However, disk B had a difference in recording sensitivity ranging from 9.0 to 12.0 mW among the four information layers, whereas disk A had a smaller difference of 9.0 to 10.0 mW, and its maximum value also was small. From this, it was confirmed that disk A could provide a favorable recording sensitivity compared with that of disk B.

In this way, it was confirmed that, by increasing the concentrations of oxygen atoms contained in an information layer with increasing the proximity of the information layer to a laser beam incident side in the information layers except for the information layer disposed farthest from the laser beam incident side, an optical information recording medium, which has a plurality of information layers, can be provided to have a favorable recording sensitivity and realize a sufficient C/N ratio.

Example 2

In Example 2, a medium in a disk shape having the same configuration as that of the optical information recording medium 2 described in Embodiment 2 was produced.

As a protective substrate 24, a polycarbonate substrate was used. The diameter of the protective substrate 24 was 12 cm, the thickness was 1.1 mm, the groove pitch was 0.32 μm and the groove depth was 20 nm.

On a surface of the protective substrate 24 at which the grooves had been formed, as a second information layer $22_2$, an Al—Cr reflective layer of about 40 nm in thickness, a Zn—S protective layer of about 15 nm in thickness, a Te—O—Pd recording layer of about 20 nm in thickness and a Zn—S protective layer of about 15 nm in thickness were laminated by sputtering in this stated order, which were formed respectively using an Al—Cr target (the ratio of the number of atoms 98:2), a Zn—S target (the ratio of the number of atoms 50:50), a Te—Pd target (the ratio of the number of atoms 90:10) and a Zn—S target (the ratio of the number of atoms 50:50). On the surface of this second information layer $22_2$, the same groove pattern as that formed in the protective substrate 24 was transferred using a UV-curable resin by a 2P method, whereby a separation layer 23 of about 20 µm in thickness was formed.

On the surface of this separation layer 23, as a first information layer $22_1$, a Zn—S protective layer of about 20 nm in thickness, a Te—O—Pd recording layer of about 6 nm in thickness and a Zn—S protective layer of about 35 nm in thickness were laminated by sputtering in this stated order, which were formed respectively using a Zn—S target (the ratio of the number of atoms 50:50), a Te—Pd target (the ratio of the number of atoms 90:10) and a Zn—S target (the ratio of the number of atoms 50:50). On the surface of this first information layer $22_1$, a sheet of polycarbonate was attached using a UV-curable resin, thus forming a transparent substrate 21 of 0.09 mm in thickness.

The respective layers were formed by using the targets of 100 mm in diameter and about 6 mm in thickness, where the reflective layers were formed with a DC power supply of 500 W, the protective layers were formed with a RF power supply of 500 W and the recording layers were formed with a DC power supply of 100 W. Furthermore, the reflective layers and the protective layers were formed in Ar ($4.2 \times 10^{-7}$ m³/s (25 sccm)) and the recording layers were formed in a mixed gas of Ar ($4.2 \times 10^{-7}$ m³/s (25 sccm)) and oxygen, where all of the layers were formed in an atmosphere kept at a gas pressure of about 0.2 Pa. Annealing further was performed thereto at 90° C. for about 2 hours so as to obtain a finished disk.

Herein, the flow rate of oxygen was regulated during the formation of the recording layers as shown in Table 4, and disk C was produced as this example and disk D was produced as a comparative example.

TABLE 4

| | | Flow rate of oxygen during formation of recording layer | Concentration of oxygen atoms contained in recording layer |
|---|---|---|---|
| Disk C | 1st information layer | $3.7 \times 10^{-7}$ m³/s (22 sccm) | 54 atomic % |
| | 2nd information layer | $3.3 \times 10^{-7}$ m³/s (20 sccm) | 50 atomic % |
| Disk D | 1st information layer | $3.3 \times 10^{-7}$ m³/s (20 sccm) | 50 atomic % |
| | 2nd information layer | $3.3 \times 10^{-7}$ m³/s (20 sccm) | 50 atomic % |

In disk C, the flow rate of oxygen was decreased more in the second information layer $22_2$ than in the first information layer $22_1$. On the other hand, in disk B, the flow rate of oxygen was made constant for the first information layer $22_1$ and the second information layer $22_2$.

Table 4 further shows the contents of oxygen in each recording layer of each disk, which were the results obtained by Auger electron spectroscopy. According to the results, it was found that the contents of oxygen (concentrations of oxygen atoms contained) in the recording layer increase in accordance with the increase of the oxygen flow rate.

With respect to the grooves of the respective information layers of disk C and disk D, a single signal at 12.3 MHz was recorded using an optical system with a wavelength of 405 nm and a NA of 0.85, while rotating the disks at a linear speed of 5.0 m/s. The pulse waveform used for the recording was a single rectangular pulse that was modulated between a peak power P1 and a bias power P2, and the pulse width was set at 20.4 ns. P2 was 1.0 mW and the reproduction power Pr was set at 0.5 mW for the reproduction of the first information layer $22_1$ and 0.7 mW for the reproduction of the second information layer $22_2$. Under these conditions, recording was performed only once with respect to an unrecorded track, and the C/N ratio of the signal was measured with a spectrum analyzer. While changing the peak power P1, the C/N ratio was measured, so that the peak power P1 at which the C/N ratio was reduced by 3 dB from the maximum value was found, and 1.3 times the found peak power P1 was set at the recording sensitivity.

Table 5 shows the results of the above-stated measurement conducted with respect to the respective information layers of disks C and D.

TABLE 5

| | | Recording sensitivity | C/N ratio |
|---|---|---|---|
| Disk C | 1st information layer | 6.0 mW | 51 dB |
| | 2nd information layer | 6.0 mW | 52 dB |
| Disk D | 1st information layer | 5.5 mW | 51 dB |
| | 2nd information layer | 6.5 mW | 52 dB |

According to Table 5, the C/N ratios of 50 dB or more could be attained in all of the information layers of both disks, and it was confirmed that these disks were at a sufficient level for practical optical information recording media. However, disk D had a difference in recording sensitivity from 5.5 mW to 6.5 mW between the two information layers, whereas disk C had a smaller difference because both information layers had the recording sensitivity of 6.0 mW.

In this way, it was confirmed that by increasing the oxygen flow rate of a recording layer in an information layer with increasing the proximity of the information layer to a laser beam incident side, an optical information recording medium, which has two information layers, can be provided to have a favorable recording sensitivity and realize a sufficient C/N ratio.

INDUSTRIAL APPLICABILITY

According to the optical information recording medium of the present invention and a method for manufacturing the same, an optical information recording medium, which has a plurality of information layers, can be provided to have a favorable recording sensitivity and realize a sufficient C/N ratio.

The invention claimed is:

1. An optical information recording medium, comprising:
a substrate; and
at least n information layers (where n is an integer of at least 3) provided on the substrate,
wherein each of the n information layers comprises a recording layer comprising Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, and
when the n information layers are represented as a first to a n-th information layers from a laser beam incident side, assuming that C(j) % denotes a concentration of oxygen atoms contained in the recording layer included in a j-th information layer (where j is an integer satisfying $1 \leq j \leq n-1$), C(1) to C(n−1) satisfy the following relationships:

$C(1) \geq C(2) \geq \ldots \geq C(n-2) \geq C(n-1)$, and $C(1) \neq C(n-1)$.

2. The optical information recording medium according to claim 1, wherein assuming that C(n) % denotes a concentration of oxygen atoms contained in the recording layer in the n-th information layer, C(n−1) and C(n) satisfy the following relationship:

$$C(n-1) \geq C(n).$$

3. The optical information recording medium according to claim 1,
wherein the n-th information layer further comprises a reflective layer that is disposed on an opposite side of the laser beam incident side with reference to the recording layer included in the n-th information layer, and
the reflective layer is made of a material having a refractive index of 3 or less and an extinction coefficient of 1 or more.

4. The optical information recording medium according to claim 1,
wherein at least one information layer of the first to the n-th information layers further comprises a protective layer that is disposed on at least one side of the laser beam incident side and an opposite side of the laser beam incident side with reference to the recording layer included in the at least one information layer, and
the protective layer is made of a dielectric material having a refractive index of 1.5 or more.

5. An optical information recording medium, comprising:
a substrate; and
a first information layer and a second information layer provided in this stated order from a laser beam incident side on the substrate,
wherein each of the first information layer and the second information layer comprises a recording layer comprising Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, and
a concentration of oxygen atoms contained in the recording layer included in the first information layer is larger than a concentration of oxygen atoms contained in the recording layer included in the second information layer.

6. The optical information recording medium according to claim 5,
wherein the second information layer further comprises a reflective layer that is disposed on an opposite side of the laser beam incident side with reference to the recording layer included in the second information layer, and
the reflective layer is made of a material having a refractive index of 3 or less and an extinction coefficient of 1 or more.

7. The optical information recording medium according to claim 5,
wherein at least one information layer of the first information layer and the second information layer further comprises a protective layer that is disposed on at least one side of the laser beam incident side and an opposite side of the laser beam incident side with reference to the recording layer included in the at least one information layer, and
the protective layer is made of a dielectric material having a refractive index of 1.5 or more.

8. A method for manufacturing an optical information recording medium comprising n information layers (where n is an integer of at least 3) provided on a substrate, the method comprising the steps of:
forming an information layer comprising a recording layer comprising Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, the step being performed n times,
wherein when the information layers formed in the information layer formation steps are represented as a first to a n-th information layers from a laser beam incident side, assuming that C(j) % denotes a concentration of oxygen atoms contained in the recording layer included in a j-th information layer (where j is an integer satisfying $1 \leq j \leq n-1$), the first to the n-th information layers are formed so that C(1) to C(n−1) satisfy the following relationships:

$$C(1) \geq C(2) \geq \ldots \geq C(n-2) \geq C(n-1), \text{ and}$$

$$C(1) \neq C(n-1).$$

9. A method for manufacturing an optical information recording medium comprising two information layers provided on a substrate, the method comprising the steps of:
forming an information layer comprising a recording layer comprising Te, O and M, where M denotes at least one element selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi, the step being performed twice,
wherein when the information layers formed in the information layer formation steps are represented as a first information layer and a second information layer from a laser beam incident side, the first information layer and the second information layer are formed so that a concentration of oxygen atoms contained in the recording layer included in the first information layer is larger than a concentration of oxygen atoms contained in the recording layer included in the second information layer.

10. The method for manufacturing an optical information recording medium according to claim 8, wherein, in the information layer formation steps, at least after the formation of the recording layer, annealing is performed so as to keep the recording layer at 60° C. or more for 5 minutes or more.

11. The method for manufacturing an optical information recording medium according to claim 9, wherein, in the information layer formation steps, at least after the formation of the recording layer, annealing is performed so as to keep the recording layer at 60° C. or more for 5 minutes or more.

* * * * *